United States Patent
Beuterbaugh et al.

(10) Patent No.: US 10,711,181 B2
(45) Date of Patent: Jul. 14, 2020

(54) METHODS AND SYSTEMS INCORPORATING N-(PHOSPHONOALKYL)IMINODIACETIC ACID PARTICULATES

(71) Applicant: Halliburton Energy Services, Inc., Houston, TX (US)

(72) Inventors: Aaron Michael Beuterbaugh, Spring, TX (US); Enrique Antonio Reyes, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/304,631

(22) PCT Filed: Jun. 13, 2016

(86) PCT No.: PCT/US2016/037148
§ 371 (c)(1),
(2) Date: Nov. 26, 2018

(87) PCT Pub. No.: WO2017/217965
PCT Pub. Date: Dec. 21, 2017

(65) Prior Publication Data
US 2019/0249076 A1    Aug. 15, 2019

(51) Int. Cl.
*C09K 8/70* (2006.01)
*C09K 8/94* (2006.01)
(Continued)

(52) U.S. Cl.
CPC .............. *C09K 8/703* (2013.01); *C09K 8/506* (2013.01); *C09K 8/518* (2013.01); *C09K 8/528* (2013.01);
(Continued)

(58) Field of Classification Search
CPC ...... C09K 8/528; C09K 2208/32; C09K 8/74; C09K 8/536; C09K 8/52; C09K 8/94;
(Continued)

(56) References Cited

U.S. PATENT DOCUMENTS

| 7,036,587 B2 | 5/2006 | Munoz, Jr. et al. |
| 8,183,179 B2 | 5/2012 | Garcia-Lopez De Victoria et al. |

(Continued)

FOREIGN PATENT DOCUMENTS

| BR | PI0823508 A2 | 7/2008 |
| EP | 2371923 A1 | 10/2011 |
| WO | 2009016549 A2 | 2/2009 |
| WO | 2012101120 A1 | 8/2012 |
| WO | 2015088561 A1 | 6/2015 |
| WO | 2016089459 A1 | 6/2016 |

OTHER PUBLICATIONS

Patent Cooperation Treaty, International Search Report and Written Opinion, PCT Appln. No. PCT/US2016/037148, dated Mar. 13, 2017.

*Primary Examiner* — Zakiya W Bates
(74) *Attorney, Agent, or Firm* — McGuireWoods, LLP

(57) ABSTRACT

Interaction of particulates of a chelating agent with an acid-reactive surface, such as various surfaces found in a wellbore, can provide a number of benefits during a treatment process. Methods for utilizing particulates of a chelating agent in a treatment process can comprise: introducing a foamed treatment fluid having a continuous liquid phase and a discontinuous gas phase into a wellbore penetrating a subterranean formation, the foamed treatment fluid comprising: a plurality of particulates comprising an N-(phosphonoalkyl)iminodiacetic acid, and an acid in which the N-(phosphonoalkyl)iminodiacetic acid is substantially insoluble; and depositing at least a portion of the plurality of particulates at one or more locations within the subterranean formation.

26 Claims, 1 Drawing Sheet

(51) Int. Cl.
*C09K 8/518* (2006.01)
*C09K 8/506* (2006.01)
*C09K 8/528* (2006.01)
*C09K 8/536* (2006.01)
*C09K 8/74* (2006.01)
*E21B 43/26* (2006.01)
*E21B 37/06* (2006.01)

(52) U.S. Cl.
CPC ............... *C09K 8/536* (2013.01); *C09K 8/74* (2013.01); *C09K 8/94* (2013.01)

(58) Field of Classification Search
CPC . C09K 8/54; E21B 43/26; E21B 37/06; E21B 41/02; E21B 43/267; E21B 41/0057; E21B 43/25; E21B 43/255
See application file for complete search history.

(56) References Cited

U.S. PATENT DOCUMENTS

| | | | |
|---|---|---|---|
| 8,697,612 | B2 | 4/2014 | Todd et al. |
| 8,853,137 | B2 | 10/2014 | Todd et al. |
| 2005/0167105 | A1 | 8/2005 | Roddy et al. |
| 2007/0158067 | A1 | 7/2007 | Xiao et al. |
| 2009/0025933 | A1 | 1/2009 | Garcia-Lopez De Victoria et al. |
| 2009/0038799 | A1 | 2/2009 | Garcia-Lopez De Victoria et al. |
| 2011/0028358 | A1 | 2/2011 | Welton et al. |
| 2011/0127039 | A1 | 6/2011 | Garcia-Lopez De Victoria et al. |
| 2011/0168395 | A1 | 7/2011 | Welton et al. |
| 2011/0190173 | A1 | 8/2011 | Cassidy et al. |
| 2013/0281329 | A1 | 10/2013 | De Wolf et al. |
| 2014/0336089 | A1 | 11/2014 | Heath et al. |
| 2015/0232744 | A1 | 8/2015 | Beuterbaugh et al. |
| 2016/0160111 | A1 | 6/2016 | Smith et al. |

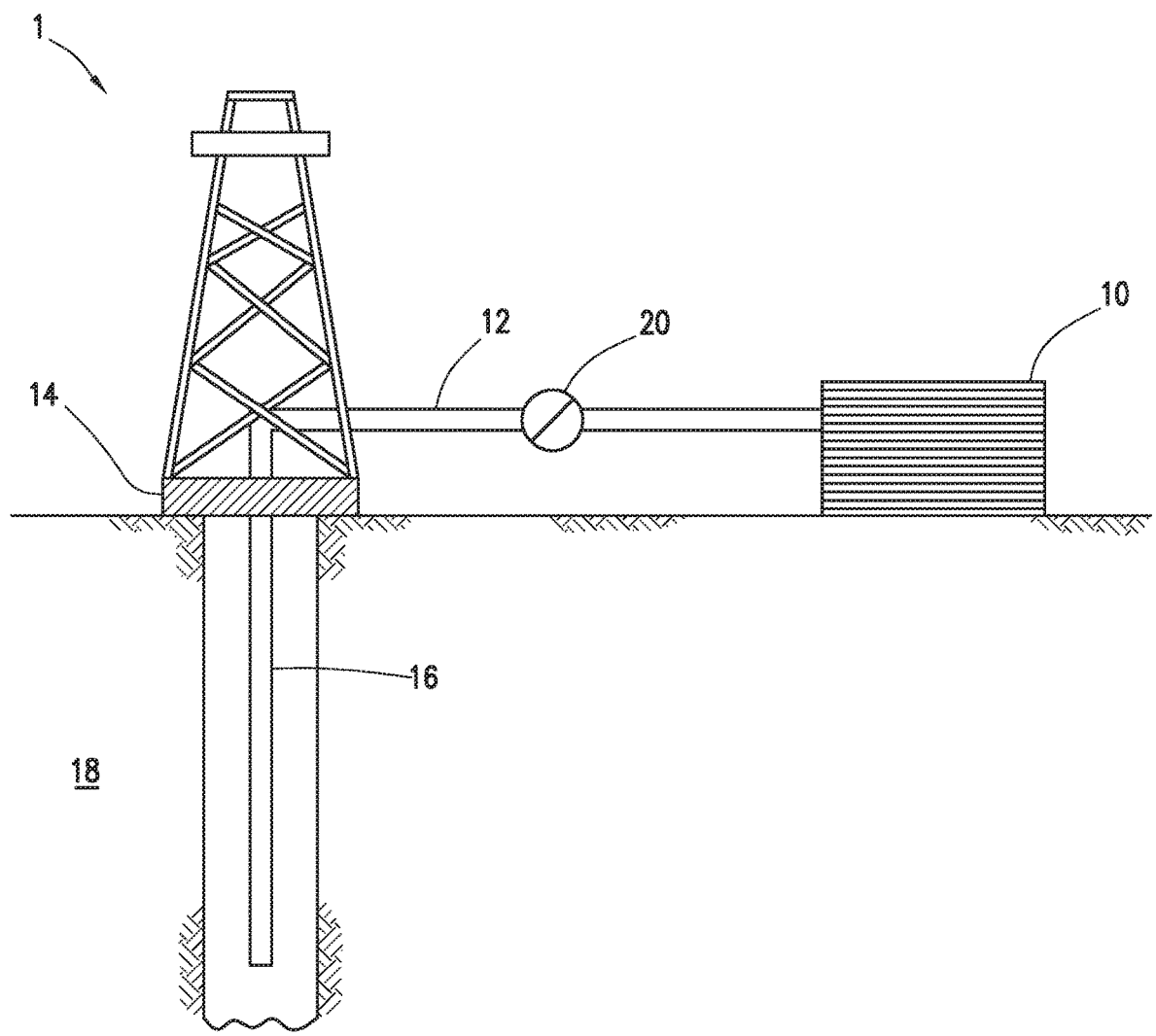

METHODS AND SYSTEMS INCORPORATING N-(PHOSPHONOALKYL)IMINODIACETIC ACID PARTICULATES

BACKGROUND

The present disclosure generally relates to acid-promoted treatment processes and, more specifically, to methods and systems incorporating particulates in acid-promoted treatment processes.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like. Related types of treatment operations can also be conducted in pipelines or other conduits used in various industrial processes or that are in fluid communication with a subterranean formation.

Acidic treatment fluids are frequently used in the course of conducting various treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material, such as a carbonate material, mineral acids such as hydrochloric acid may often be sufficient to affect dissolution. Organic acids such as formic acid or acetic acid may be used in a similar manner to hydrochloric acid when dissolving a non-siliceous material. Siliceous materials, in contrast, are only readily dissolvable using hydrofluoric acid, optionally in combination with other mineral acids or organic acids. Similar considerations apply when dissolving scales of various types.

During an acidizing or scale removal operation, an acid-reactive substance can be dissolved by one or more acids to expand existing flow pathways in a subterranean formation, to create new flow pathways in a subterranean formation, and/or to remove scale or acid-reactive precipitation damage. Similar benefits can be realized by treating a pipeline or other fluid conduit having an undesired acid-reactive substance therein. The acid-reactive substance can be part of the native formation matrix, form in the course of operating a wellbore (e.g., scale), or have been deliberately introduced into the wellbore (e.g., proppant or gravel particulates). In carbonate formations, for example, a carbonate mineral in the native formation matrix may be acidized in order to stimulate production.

Although carbonate minerals can be readily acidized with both mineral acids and organic acids, the acid's reactivity with carbonate minerals is often excessive and may lead to various undesirable effects. For example, excessively rapid reaction of a carbonate mineral with an acid can lead to bulk erosion, rather than the desired wormhole formation or the creation of other conductive channels in the formation matrix in order to increase permeability. As used herein, the term "wormhole" refers to a channel generated in the matrix of a subterranean formation that positively contributes to increased incremental permeability. Scaling may also become problematic when a carbonate mineral is inadvertently reacted with an acid and the solubility limit of dissolved metal cations is exceeded. Further, the reaction of mineral and organic acids with soft and friable matrices, particularly at elevated formation temperatures, can often occur too rapidly and lead to undesirable matrix deconsolidation.

Another problem associated with the rapid reaction of carbonate minerals and other acid-reactive substances is that the excessive acid reactivity can preclude placement of the acid in a location where its reactivity is more desired. For example, rapid spending of an acid in the near-wellbore region of a carbonate formation can preclude deeper penetration of the acid into the formation matrix to promote more effective stimulation. Techniques such as closed fracture acidizing, in which an acid is introduced into a fracture after it has been created but before it closes, may be used to address the penetration and acid reactivity issues. Both viscosified and non-viscosified acids may be used in this regard, but such techniques may not be applicable in carbonate formations also having significant quantities of quartz or aluminosilicates (15-65%). In order to achieve deeper acid penetration into the formation matrix, greater quantities of the acid may need to be used, which may be undesirable due to cost, safety, time and environmental considerations. Gel damage and/or acid-promoted damage to the near-wellbore region can also occur, which may necessitate further damage control and remediation operations, thereby adding additional cost and time delays. Costly diverting strategies and/or alternative treatment protocols not relying upon strong acids may sometimes be needed to avoid excessive reaction of a carbonate mineral with an acid in the near-wellbore region.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver foamed treatment fluids of the present disclosure to a downhole location, according to one or more embodiments.

DETAILED DESCRIPTION

The present disclosure generally relates to acid-promoted treatment processes and, more specifically, to methods and systems incorporating particulates in acid-promoted treatment processes.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, excessive reactivity of an acid during various acid-promoted treatment operations can sometimes be problematic. Excessive acid reactivity can be especially problematic in subterranean treatment operations, where there may be issues of wellbore damage, ineffective stimulation, and combinations thereof. In certain cases, ineffective stimulation can result from failure to deliver the acid to a wellbore location where the acid's presence is more desired. For example, deep penetration of an acid into a fracture network of a subterranean formation can be problematic when the acid's reactivity is excessive and spending occurs prematurely. Involved diverting strategies may sometimes be needed to achieve successful placement of an acidic treatment fluid. In another example, acid-promoted dissolution can instigate undesirable secondary precipitation reactions. Wellbore remediation operations may sometimes be needed to offset the detrimental effects of excessive acid reactivity. All of these issues can lead to production delays and increased costs of treating a subterranean formation.

Chelating agents represent an alternative approach for affecting dissolution of certain acid-reactive surfaces, particularly the types of acid-reactive surfaces that are present in carbonate formations. In contrast to organic and mineral acids, which promote dissolution substantially through their acidity, chelating agents affect dissolution by complexing metal ions comprising an acid-reactive surface. As used herein, the terms "complex," "complexing," "complexation" and other grammatical variants thereof refer to the formation of a metal-ligand bond, such as through formation of a chelate. Without being bound by theory or mechanism, it is believed that complexation of metal ions takes place through a lone pair of electrons within the chelating agent. If the lone pair of electrons is unavailable for forming a metal-ligand bond (e.g., through protonation), the chelating agent is then unable to affect complexation. As a result, most chelating agents have an effective pH range over which they are active to affect complexation. In addition, the protonation state of a chelating agent can have a profound influence on the chelating agent's solubility in a treatment fluid. In order to promote good contact and reactivity for affecting dissolution of an acid-reactive surface, chelating agents are most often used in a solubilized form in a suitable protonation state.

Although siliceous materials are usually not directly dissolvable by chelating agents, it can still be beneficial to utilize a chelating agent in conjunction with acidizing a siliceous material. Specifically, complexation of dissolved metal ions with a chelating agent can help preclude secondary precipitation reactions of the metal ions with dissolved silicon compounds. Similarly, chelating agents can sometimes help prevent precipitation from occurring upon exceeding the solubility limit of uncomplexed metal ions.

Like dissolution strategies promoted directly by an acid, it can sometimes be difficult to place a chelating agent in a desired location within a subterranean formation or other locale undergoing treatment. For example, reactivity of a chelating agent in the near-wellbore region of a subterranean formation can preclude stimulation from occurring at locations more removed from the wellbore.

The present inventors discovered that utilizing an acidic treatment fluid containing a chelating agent in insoluble form can address a number of the issues noted above. In particular, the present inventors discovered that a foamed treatment fluid containing particulates of an N-(phosphonoalkyl)iminodiacetic acid chelating agent can address issues associated with both acid reactivity and the intended placement of the treatment fluid during a treatment operation. In particular embodiments, the particulates of the N-(phosphonoalkyl)iminodiacetic acid can initially be in a form that is inactive for complexing a metal ion, but as the treatment fluid spends and the pH rises, the N-(phosphonoalkyl) iminodiacetic acid can regain its ability for metal ion complexation to occur. The delayed reactivity of the N-(phosphonoalkyl)iminodiacetic acid can allow the chelating agent and the acid to react in more desirable locations. In addition, by foaming the treatment fluid and utilizing particulates of an initially inactive chelating agent therein, a number of concurrent advantages can be realized, as discussed hereinafter.

With regard to the reactivity of the acid in the foamed treatment fluid, the inventors discovered that foaming the treatment fluid can advantageously decrease the acid's reactivity, thereby precluding its overly rapid reaction with an acid-reactive surface. The diminished acid reactivity can, in turn, foster deeper penetration of the acid into a subterranean formation, thereby promoting more effective stimulation. Especially at higher formation temperatures, the deep penetration offered by the foamed treatment fluids of the present disclosure can be particularly advantageous through allowing stimulation to take place in instances where higher reactivity acids are ineffective, such as unfoamed fluids containing hydrochloric acid or acetic acid. The acidity of the treatment fluid itself advantageously does not inhibit its ability to form a foam.

At pH values where N-(phosphonoalkyl)iminodiacetic acids are at least partially deprotonated, the N-(phosphonoalkyl)iminodiacetic acids contain at least one lone pair of electrons that is capable of forming a metal-ligand bond. In the case of N-(phosphonomethyl)iminodiacetic acid (PMIDA), the pH at which initial deprotonation takes place is about 2 (the first two $pK_a$ values are approximately 2.00 and 2.25). Even after initial deprotonation takes place, the solubility of PMIDA in aqueous fluids remains minimal until a pH of about 3.5 is reached, at which point the deprotonated form of the PMIDA becomes much more soluble. At this point, the PMIDA can then function to complex a metal ion. The delayed reactivity of the N-(phosphonoalkyl)iminodiacetic acid can similarly provide a number of advantages in a treatment operation, as alluded to above and discussed in more detail hereinafter.

By suppressing the complex-forming capabilities of the N-(phosphonoalkyl)iminodiacetic acid, the foamed treatment fluid can initially react through acid-promoted dissolution rather than through chelation effects. As noted above, the decreased reactivity of the acid can itself be advantageous. After the acid in the foamed treatment fluid reacts and at least partially spends, the N-(phosphonoalkyl)iminodiacetic acid may then at least partially deprotonate with the rise in pH and become active for complexation to occur. Thus, the type of dissolution promoted by the foamed treatment fluid can be staggered at different points in space and/or time. For example, deeper penetration of the N-(phosphonoalkyl)iminodiacetic acid into the matrix of a subterranean formation may occur than would otherwise be possible if the chelating agent were initially active and in solubilized form. Furthermore, by utilizing the N-(phosphonoalkyl)iminodiacetic acid in an insoluble particulate form that subsequently becomes soluble, greater quantities of the chelating agent may be carried in the foamed treatment fluid than would otherwise be possible for a soluble form of the chelating agent. In either case, the N-(phosphonoalkyl) iminodiacetic acid chelating agent may complex metal ions directly from a surface or metal ions that were previously solubilized, such as through an interaction with the acid. N-(phosphonoalkyl)iminodiacetic acids can also provide dual functionality as a scale inhibitor as well.

Further advantages can also be realized by making use of the initial insolubility of the N-(phosphonoalkyl)iminodiacetic acid particulates themselves. Specifically, by depositing initially insoluble particulates of the N-(phosphonoalkyl)iminodiacetic acid at a desired location in wellbore or in a subterranean formation penetrated by a wellbore (e.g., in a filter cake), diversion of the foamed treatment fluid or a subsequently introduced treatment fluid may be realized. The deposition may occur directly upon an acid-reactive material, thereby tempering its reaction with the acid in the foamed treatment fluid. Thus, the foamed treatment fluids of the present disclosure may allow intervals of a subterranean formation to undergo treatment that might otherwise be inaccessible without employing more complex diverting strategies. Moreover, upon at least partially spending the acid in the foamed treatment fluid, the deposited N-(phosphonoalkyl)iminodiacetic acid can undergo dissolution with the rise in pH. Advantageously, this can allow the diverting agent to be self-cleaning once a diversion operation is complete, thereby avoiding or decreasing the need for subsequent workovers or overflushes, and potentially lowering the cost of production.

As a still further advantage of the foamed treatment fluid disclosed herein, foaming of the treatment fluid can lower the amount of water or other carrier fluid needed for formulation. This can be particularly advantageous in locales where suitable carrier fluids are difficult to source. Still further, the presence of a foam within a wellbore or another location can help suppress fines generated in conjunction with a treatment operation.

PMIDA and other N-(phosphonoalkyl)iminodiacetic acids can also present a number of other advantages when used in a downhole environment. PMIDA is a relatively inexpensive material, thereby not adding an excessive cost burden to large scale operations. Moreover, PMIDA is believed to be environmentally benign, due at least in part to low bioaccumulation and limited toxicity. PMIDA advantageously possesses a sufficiently high chemical stability over the short term to be effective in a treatment operation, but a short enough degradation or biodegradation lifetime to make it environmentally friendly for use in most locales. Still further, PMIDA has good thermal stability, thereby allowing it to be used in high temperature subterranean formations, including those having a temperature above 300° F. Thus, PMIDA and other N-(phosphonoalkyl)iminodiacetic acids can be used effectively under thermal conditions where increased acid reactivity is sometimes problematic.

In various embodiments, foamed treatment fluids of the present disclosure can comprise: a plurality of particulates comprising an N-(phosphonoalkyl)iminodiacetic acid, and an acid in which the N-(phosphonoalkyl)iminodiacetic acid is substantially insoluble. The foamed treatment fluids have a continuous liquid phase and a discontinuous gas phase, as specified in more detail hereinafter. As used herein, the term "substantially insoluble" refers to the condition of having about 5 wt. % or less solubility in a given fluid at a particular pH. In some embodiments, the N-(phosphonoalkyl)iminodiacetic acid can have a solubility of about 1 wt. % or less in a given fluid, such as an aqueous fluid.

In various embodiments, the neutral form of the N-(phosphonoalkyl)iminodiacetic acid used in the foamed treatment fluids of the present disclosure may have the structure shown in Formula 1

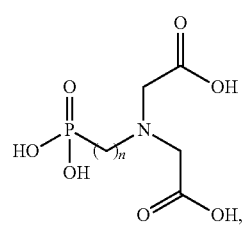

Formula 1 wherein n is an integer ranging between 1 and about 20. In some embodiments, a particularly suitable N-(phosphonoalkyl)iminodiacetic acid for practicing the disclosure herein can be N-(phosphonomethyl)iminodiacetic acid (PMIDA), in which n is 1. In some or other more particular embodiments, n may range between 1 and about 5, or between about 5 and about 20, or between about 5 and about 15, or between about 10 and about 20. Longer chain lengths, such as between about 5 and about 20 carbons in length, may be desirable to lessen the solubility of the N-(phosphonoalkyl) iminodiacetic acid and to help maintain the N-(phosphonoalkyl)iminodiacetic acid in particulate form as long as possible during a treatment operation. Additional functionality may also be introduced to the N-(phosphonoalkyl) iminodiacetic acid in order to further tailor its solubility, $pK_a$ values, and/or degradation rate, for example.

In order to maintain the N-(phosphonoalkyl)iminodiacetic acid in a particulate form, the foamed treatment fluids described herein may initially have a pH at which the N-(phosphonoalkyl)iminodiacetic acid is substantially insoluble. In some embodiments, the foamed treatment fluids may have a pH of about 3.5 or less. In other embodiments, the foamed treatment fluids may have a pH of about 3 or less, or about 2.5 or less, or about 2 or less, or about 1.5 or less, or about 1 or less. In more particular embodiments, the foamed treatment fluids may have a pH ranging between about 3.5 and about 0, or between about 3 and about 0, or between about 3 and about 1, or between about 2.5 and about 1, or between about 2 and about 0.5, or between about 2 and about 1. Choice of a particular pH may be dictated, for example, by how aggressive one wants the acid to be toward an acid-reactive surface and/or how long one wants to maintain the N-(phosphonoalkyl)iminodiacetic acid in an insoluble form.

In various embodiments, the foamed treatment fluids described herein may contain at least one acid in an amount needed to produce a desired pH. Suitable acids include those in which the N-(phosphonoalkyl)iminodiacetic acid is not substantially soluble. Illustrative acids may include, for example, hydrochloric acid, hydrobromic acid, formic acid, acetic acid, chloroacetic acid, dichloroacetic acid, trichloroacetic acid, citric acid, maleic acid, glycolic acid, lactic acid, malic acid, oxalic acid, the like, and any combination thereof. Methanesulfonic acid and similar sulfonic acids may have a higher propensity for dissolving N-(phosphonoalkyl)iminodiacetic acids. In some embodiments, the foamed treatment fluids described herein may be free of methanesulfonic acid and similar sulfonic acids.

In some embodiments, the acid may be generated from an acid-generating compound. Examples of suitable acid-generating compounds may include, but are not limited to, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In some or other various embodiments, the foamed treatment fluids of the present disclosure can be substantially free of hydrofluoric acid or a hydrofluoric acid-generating compound. Accordingly, in some embodiments, the foamed treatment fluids described herein can be effective for removing a non-siliceous material from a siliceous formation. Thereafter, a treatment fluid comprising hydrofluoric acid or a hydrofluoric acid-generating compound can be used to complete the treatment of the subterranean formation, if desired.

In various embodiments, a loading of the N-(phosphonoalkyl)iminodiacetic acid particulates in the foamed treatment fluid may range between about 0.1% to about 40% of the foamed treatment fluid by weight. In more particular embodiments, the N-(phosphonoalkyl)iminodiacetic acid particulates may be included in the foamed treatment fluid in an amount ranging between about 1% to about 10% by weight, or between about 10% to about 20% by weight, or between about 20% to about 30% by weight, or between about 30% to about 40% by weight, or between about 5% to about 15% by weight, or between about 15% to about 30% by weight.

In various embodiments, the foamed treatment fluids of the present disclosure may include a gas and an optional foaming agent.

The gas used to promote foaming of the treatment fluids provided herein can be air, nitrogen, carbon dioxide, a gaseous hydrocarbon (e.g., methane, ethane, propane, or the like), or an inert gas (e.g., argon, helium or neon). Air, nitrogen and carbon dioxide can be advantageous due to their low cost and ready availability. The gas may be present in an amount sufficient to foam the treatment fluid and expand it to a particular volume. In some embodiments, the gas may be included in the foamed treatment fluid in an amount ranging between about 50% to about 95% by volume of the foamed treatment fluid. In more particular embodiments, an amount of gas in the foamed treatment fluid may range between about 50% to about 60% by volume, or between about 60% to about 70% by volume, or between about 70% to about 80% by volume, or between about 80% to about 90% by volume, or between about 90% to about 95% by volume. Introduction of the gas into the treatment fluid to promote foaming may be conducted using suitable techniques and equipment known to persons having ordinary skill in the art. As used herein, the term "foam quality" refers to the percentage ratio of the volume of gas to the volume of gas and liquids present under the conditions at which the foamed treatment fluid is used.

In some embodiments, a foaming agent or foam stabilizer can also be included in the foamed treatment fluids described herein to facilitate gas dispersion and to enhance the stability of the resulting foam. Suitable foaming agents for use in conjunction with the various embodiments of the present disclosure may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecanesulfonate, trimethylhexadecyl ammonium bromide, the like, or any combination thereof. Foaming agents may be included in the foamed treatment fluids at concentrations ranging typically from about 0.05% to about 2% by weight relative to the amount of liquid phase that is present. Commercially available examples of suitable foaming agents include "HC-2" and "PEN-5M" available from Halliburton Energy Services, Inc.

The foamed treatment fluids of the present disclosure may comprise an aqueous fluid or an oleaginous fluid as their continuous liquid phase. Suitable aqueous fluids may include, for example, fresh water, acidified water, salt water, seawater, brackish water, produced water, flowback water, brine (e.g., a saturated salt solution), or an aqueous salt solution (e.g., a non-saturated salt solution). Aqueous fluids may be obtained from any suitable source.

In some embodiments, an organic co-solvent may be included with an aqueous fluid. Suitable organic co-solvents may include, but are not limited to, glycols and alcohol solvents, for example. When present, the amount of the organic co-solvent may range between about 1% to about 50% by volume of the continuous liquid phase.

In other various embodiments, the continuous liquid phase of the foamed treatment fluids may comprise an oleaginous fluid. Suitable oleaginous fluids may include, for example, an organic solvent, a hydrocarbon, oil, a refined component of oil, gasoline, xylenes, or any combination thereof.

In additional embodiments, the foamed treatment fluids described herein may further comprise any number of additives that are commonly used in downhole operations including, for example, silica scale control additives, corrosion inhibitors, surfactants, gel stabilizers, anti-oxidants, polymer degradation prevention additives, relative permeability modifiers, scale inhibitors, emulsifying agents, de-emulsifying agents, iron control agents, proppants or other particulates, particulate diverters, salts, acids, fluid loss control additives, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. Given the benefit of this disclosure, one having ordinary skill in the art will be able to formulate a foamed treatment fluid having properties suitable for use in a given application.

As indicated above, the foamed treatment fluids of the present disclosure can be used in conjunction with various types of treatment operations. Without limitation, the foamed treatment fluids of the present disclosure can be used in conjunction with fracturing operations, acid fracturing operations, matrix acidizing operations, scale dissolution operations, and the like. In some embodiments, the particulates of the N-(phosphonoalkyl)iminodiacetic acid may become deposited in conjunction with the treatment operation, and in some further embodiments, the deposited particulates may undergo subsequent redissolution. In some embodiments, the deposited particulates can promote fluid diversion, and in some embodiments, the deposited particulates can promote fluid diversion away from an acid-reactive surface upon which the particulates are deposited.

Accordingly, in various embodiments, methods described herein can comprise: introducing a foamed treatment fluid having a continuous liquid phase and a discontinuous gas phase into a wellbore penetrating a subterranean formation, the foamed treatment fluid comprising: a plurality of particulates comprising an N-(phosphonoalkyl)iminodiacetic acid, and an acid in which the N-(phosphonoalkyl)iminodiacetic acid is substantially insoluble; and depositing at least a portion of the plurality of particulates at one or more locations within the subterranean formation. In some embodiments, the methods may comprise depositing at least a portion of the plurality of particulates upon an acid-reactive surface.

In some embodiments, the particulates may be at least partially deposited in a fracture network within the subterranean formation. In such instances, deeper chelation-promoted stimulation can take place in the subterranean formation than would otherwise be realized (e.g., beyond the near-wellbore area). For example, locations in the fracture network nearer the wellbore may undergo initial acid-promoted dissolution, and the initially inactive particulates of the N-(phosphoalkyl)iminodiacetic acid may be transported deeper within the fracture network than would otherwise be possible. The initially insoluble and inactive particulates may then undergo slow dissolution as the acid in the foamed treatment fluid spends and the pH rises, thereby allowing chelation-promoted dissolution to take place at different locations within the fracture network than would otherwise be possible. Further, by dissolving the particulates following their penetration into the fracture network, the fracture conductivity can remain high.

In other embodiments, the particulates may be deposited as a filter cake within the subterranean formation. In such instances, the filter cake can promote fluid loss control and/or fluid diversion within the subterranean formation. Further, in some embodiments, the particulates of the N-(phosphoalkyl)iminodiacetic acid may undergo dissolution as the acid in the foamed treatment spends and the pH rises, thereby imparting self-cleaning characteristics to the filter cake.

In some embodiments, the foamed treatment fluids described herein may be used for scale removal applications. For scale removal applications, the foamed treatment fluids presented herein can be particularly useful in removing inorganic scale, which may include magnesium chloride, calcium carbonate, iron carbonate, calcium sulfate, iron oxides, and other metal-containing scales to name a few.

In some embodiments, the foamed treatment fluid may be introduced to a subterranean formation at a sufficient pressure to create or enhance at least one fracture in the formation. That is, in some embodiments, the foamed treatment fluid may be introduced above the fracture gradient pressure of the subterranean formation. In other embodiments, the foamed treatment fluids described herein may be introduced to a wellbore following an initial fracturing fluid which generates or expands a fracture network in the subterranean formation. In either instance, the N-(phosphonoalkyl)iminodiacetic acid may act to dissolve the minerals of the fracture faces so as to improve the conductive pathway of the fracture.

In some or other various embodiments, methods of the present disclosure can comprise: interacting a foamed treatment fluid having a continuous liquid phase and a discontinuous gas phase with an acid-reactive surface, the foamed treatment fluid comprising: a plurality of particulates comprising an N-(phosphonoalkyl)iminodiacetic acid, and an acid in which the N-(phosphonoalkyl)iminodiacetic acid is substantially insoluble; reacting the acid with at least a portion of the acid-reactive surface, thereby at least partially spending the acid; and as the acid at least partially spends and a pH of the foamed treatment fluid rises, dissolving the N-(phosphonoalkyl)iminodiacetic acid in the foamed treatment fluid. In further embodiments, the methods may comprise depositing at least a portion of the plurality of particulates upon the acid-reactive surface, and diverting at least a portion of the foamed treatment fluid or a subsequently introduced treatment fluid with the plurality of particulates following deposition thereof.

In some embodiments, the foamed treatment fluids presented herein may be used to remove scale from equipment such as pipes, tubulars, heat exchangers, and the like that are not easily cleaned using conventional methods. In some embodiments, the equipment having an acid-reactive surface thereon may be in within a wellbore or subterranean formation penetrated by a wellbore. The equipment also may be related to a geothermal well or a mining operation. The equipment also may relate to pipelines or refining equipment as well.

A wide variety of acid-reactive surfaces may be treated by practicing the various embodiments of the present disclosure. In various embodiments, the acid-reactive surface may comprise a metal, a metal salt, a mineral (particularly a carbonate mineral), or the like. In some particular embodiments, the acid-reactive surface may be present in a wellbore penetrating a subterranean formation during a subterranean treatment operation, such as acidizing operation or a fracturing operation, for example. The acid-reactive surface may be natively present in the wellbore or have been deliberately placed in the wellbore during a subterranean treatment operation. In more particular embodiments, the acid-reactive surface may comprise, for example, a matrix comprising the subterranean formation or a particulate pack (e.g., a proppant pack or a gravel pack) that is present in the wellbore.

Illustrative carbonate minerals that may be at least partially dissolved by practicing the various embodiments of the present disclosure include, for example, calcite (calcium carbonate), dolomite (calcium magnesium carbonate), siderite (iron carbonate) and any combination thereof. Calcite and dolomite may be particularly prevalent in carbonate formations. Optionally, other minerals may be admixed with calcite and/or dolomite in any combination. Other minerals that may be present in a calcite or dolomite surface undergoing treatment according to the present disclosure may include, for example, iron sulfide, iron carbonate, silicates and aluminosilicates.

In more specific embodiments, a silicate or aluminosilicate can be present along with a carbonate mineral, and the foamed treatment fluids described herein can promote dissolution of the carbonate mineral without substantially affecting the silicate or aluminosilicate. The N-(phosphonoalkyl)iminodiacetic acid can complex metal ions liberated from the carbonate mineral and lessen the likelihood of secondary precipitation reactions when the silicate or aluminosilicate undergoes subsequent treatment with hydrofluoric acid or a hydrofluoric acid-generating compound to promote dissolution thereof.

As indicated above, in some embodiments, methods of the present disclosure may further comprise diverting at least a portion of the foamed treatment fluid or a subsequently introduced treatment fluid with the plurality of particulates following deposition thereof. The deposited particulates may allow diversion to take place from a first location in the wellbore to a second location that is not otherwise able to undergo effective treatment. In some embodiments, the first location may comprise the near-wellbore area, such as the walls of the wellbore, and the second location may comprise a portion of the subterranean formation radially offset from the walls of the wellbore (i.e., deeper within a fracture network). This can allow stimulation to occur within the subterranean formation in deference to spending of the acid in the near-wellbore area, possibly accompanied by subterranean formation damage. Similarly, the N-(phosphonoalkyl)iminodiacetic acid may penetrate deeper into the subterranean formation and promote dissolution via complexation upon at least partial spending of the acid. In some embodiments, the first location may comprise an interval that is nearer the upper terminus of a wellbore and the second location may comprise an interval that is more removed from the upper terminus of the wellbore, such as in bullheading operations. In still other embodiments, the first location may comprise an interval that is more removed from the upper terminus of a wellbore and the second location may comprise an interval that is nearer the upper terminus of the wellbore.

In still further embodiments, the methods of the present disclosure may comprise dissolving at least a portion of the acid-reactive surface with the acid in the foamed treatment fluid, such that a pH of the foamed treatment fluid rises as the acid at least partially spends during dissolution. Further, the N-(phosphonoalkyl)iminodiacetic acid can at least partially deprotonate as the pH rises, such that the N-(phosphonoalkyl)iminodiacetic acid then becomes active for complexing a metal ion. Accordingly, upon undergoing the pH rise, methods of the present disclosure can include dissolving at least a portion of the acid-reactive surface with a deprotonated form of the N-(phosphonoalkyl)iminodiacetic acid, such as through a complexation reaction.

In some embodiments, the methods of the present disclosure may comprise dissolving the N-(phosphonoalkyl)iminodiacetic acid in the foamed treatment fluid. In some embodiments, dissolution may take place at a pH of about 4 or greater. In more specific embodiments, dissolution may take place at mildly acidic pH values, such as a pH of about 5 to about 7, or about 5.5 to about 7, or about 6 to about 7. In other embodiments, dissolution may take place at neutral to alkaline pH values, such as a pH value of about 7 to about 12, or about 7 to about 10, or about 7 to about 9. Such pH ranges may be attained upon at least partial spending of the acid initially present in the foamed treatment fluids.

In other various embodiments, systems configured for delivering a foamed treatment fluid of the present disclosure to a downhole location are described herein. In various embodiments, the systems can comprise a pump fluidly coupled to a tubular, the tubular containing a foamed treatment fluid comprising a plurality of particulates comprising an N-(phosphonoalkyl)iminodiacetic acid, and an acid in which the N-(phosphonoalkyl)iminodiacetic acid is substantially insoluble. The foamed treatment fluid has a continuous liquid phase and a discontinuous gas phase.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a foamed treatment fluid of the present disclosure to a subterranean formation at or above a fracture gradient of the subterranean formation, but it may also be used in cases where fracturing is not desired. The foamed treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the foamed treatment fluid to the high pressure pump. In such embodiments, the low pressure pump may "step up" the pressure of a foamed treatment fluid before it reaches the high pressure pump. Alternately, the low pressure pump may be used to directly introduce the foamed treatment fluid to the subterranean formation. As with high pressure pumps, low pressure pumps may similarly be capable of introducing particulate matter into a subterranean formation.

In some embodiments, the systems described herein can further comprise a mixing tank that is upstream of the pump and in which the N-(phosphonoalkyl)iminodiacetic acid is formulated with a carrier fluid. In various embodiments, the pump (e.g., a low pressure pump, a high pressure pump, or a combination thereof) may convey the foamed treatment fluid from the mixing tank or other source of the foamed treatment fluid to the tubular. In some embodiments, foaming may take place during the transfer process. In other embodiments, however, the foamed treatment fluid can be formulated offsite and transported to a worksite, in which case the foamed treatment fluid may be introduced to the tubular via the pump directly from its shipping container (e.g., a truck, a railcar, a barge, or the like) or from a transport pipeline. In either case, the foamed treatment fluid may be drawn into the pump, elevated to an appropriate pressure, and then introduced into the tubular for delivery downhole.

FIG. 1 shows an illustrative schematic of a system that can deliver foamed treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a foamed treatment fluid of the present disclosure may be at least partially formulated. The foamed treatment fluid may be conveyed via line 12 to wellhead 14, where the treatment fluid enters tubular 16, tubular 16 extending from wellhead 14 into subterranean formation 18. Tubular 16 may include orifices that allow the foamed treatment fluid to enter into the wellbore. Pump 20 may be configured to raise the pressure of the foamed treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the foamed treatment fluid may, in some embodiments, flow back to wellhead 14 and exit subterranean formation 18. In some embodiments, the foamed treatment fluid that has flowed back to wellhead 14 may subsequently be recovered and recirculated to subterranean formation 18. In other embodiments, the foamed treatment fluid may flow back to wellhead 14 in a produced hydrocarbon fluid from subterranean formation 18.

It is also to be recognized that the disclosed foamed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for treating an acid-reactive surface in wellbore. The methods comprise: introducing a foamed treatment fluid having a continuous liquid phase and a discontinuous gas phase into a wellbore penetrating a subterranean formation, the foamed treatment fluid comprising: a plurality of particulates comprising an N-(phosphonoalkyl)iminodiacetic acid, and an acid in which the N-(phosphonoalkyl)iminodiacetic acid is substantially insoluble; and depositing at least a portion of the plurality of particulates at one or more locations within the subterranean formation.

B. Methods for treating an acid-reactive surface. The methods comprise: interacting a foamed treatment fluid having a continuous liquid phase and a discontinuous gas phase with an acid-reactive surface, the foamed treatment fluid comprising: a plurality of particulates comprising an N-(phosphonoalkyl)iminodiacetic acid, and an acid in which the N-(phosphonoalkyl)iminodiacetic acid is substantially insoluble; reacting the acid with at least a portion of the acid-reactive surface, thereby at least partially spending the acid; and as the acid at least partially spends and a pH of the foamed treatment fluid rises, dissolving the N-(phosphonoalkyl)iminodiacetic acid in the foamed treatment fluid.

C. Foamed treatment fluids having a continuous liquid phase and a discontinuous gas phase. The foamed treatment fluids comprise: a plurality of particulates comprising an N-(phosphonoalkyl)iminodiacetic acid; and an acid in which the N-(phosphonoalkyl)iminodiacetic acid is substantially insoluble.

D. Systems for introducing a foamed treatment fluid into a wellbore. The systems comprise: a pump fluidly coupled to a tubular, the tubular containing a foamed treatment fluid having a continuous liquid phase and a discontinuous gas phase and comprising: a plurality of particulates comprising an N-(phosphonoalkyl)iminodiacetic acid; and an acid in which the N-(phosphonoalkyl)iminodiacetic acid is substantially insoluble.

Each of embodiments A-D may have one or more of the following additional elements in any combination:

Element 1: wherein the plurality of particulates is at least partially deposited in a fracture network within the subterranean formation.

Element 2: wherein the method further comprises diverting at least a portion of the foamed treatment fluid or a subsequently introduced treatment fluid with the plurality of particulates following deposition thereof.

Element 3: wherein the method further comprises dissolving at least a portion of an acid-reactive surface in the subterranean formation with the acid in the foamed treatment fluid, a pH of the foamed treatment fluid rising as the acid at least partially spends during dissolution.

Element 4: wherein the N-(phosphonoalkyl)iminodiacetic acid at least partially deprotonates as the pH rises and the method further comprises dissolving at least a portion of the acid-reactive surface in the subterranean formation with a deprotonated form of the N-(phosphonoalkyl)iminodiacetic acid.

Element 5: wherein the acid-reactive surface comprises a matrix of the subterranean formation or a particulate pack within the subterranean formation.

Element 6: wherein the subterranean formation comprises a carbonate formation and the matrix comprises a mineral selected from the group consisting of calcite, dolomite, siderite, and any combination thereof.

Element 7: wherein the N-(phosphonoalkyl)iminodiacetic acid has a structure of

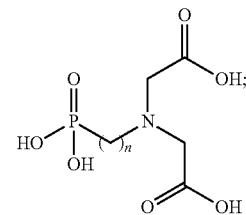

wherein n is an integer ranging between 1 and about 20.

Element 8: wherein the N-(phosphonoalkyl)iminodiacetic acid comprises N-(phosphonomethyl)iminodiacetic acid.

Element 9: wherein the foamed treatment fluid has a pH of about 3.5 or less.

Element 10: wherein the foamed treatment fluid is substantially free of hydrofluoric acid or a hydrofluoric acid-generating compound.

Element 11: wherein the acid-reactive surface is within a wellbore or a subterranean formation penetrated by the wellbore.

Element 12: wherein the method further comprises depositing at least a portion of the plurality of particulates upon the acid-reactive surface; and diverting at least a portion of the foamed treatment fluid or a subsequently introduced treatment fluid with the plurality of particulates following deposition thereof.

Element 13: wherein the method further comprises dissolving at least a portion of the acid-reactive surface with a deprotonated form of the N-(phosphonoalkyl)iminodiacetic acid.

Element 14: wherein dissolving at least a portion of the acid-reactive surface comprises complexing a metal ion with the deprotonated form of the N-(phosphonoalkyl)iminodiacetic acid.

By way of non-limiting example, exemplary combinations applicable to A-D include:

The method of A in combination with elements 1 and 3, 3 and 4, 3 and 5, 5 and 6, 1 and 7, 2 and 7, 1 and 8, 2 and 8, 1 and 9, 2 and 9, 7 and 9, or 6 and 10.

The method of B in combination with elements 11 and 12, 2 and 12, 7 and 13, 13 and 14, 3 and 7, 5 and 11, 9 and 11, or 7 and 9.

The foamed treatment fluid of C or the system of D in combination with elements 7 and 9, 8 and 9, 7 and 10, or 9 and 10.

To facilitate a better understanding of the embodiments of the present disclosure, the following examples of preferred or representative embodiments are given. In no way should the following examples be read to limit, or to define, the scope of the disclosure.

EXAMPLES

Example 1: Formation of a Foamed Treatment Fluid.

A 0.6 M slurry of PMIDA particulates in water was combined with 0.5 wt. % HC-2 foaming agent (Halliburton Energy Services). The mixture was added to a Parr reactor, which was charged with 500 psi of nitrogen gas at 350° F. and stirred at 750 rpm with a mechanical stirrer. Upon reaching the set point temperature of 350° F., the total pressure had increased to 900 psi. A stable foam was produced as indicated by an increase in treatment fluid volume, which was observed visually. A semi-quantitative estimate of the foam quality was >80%. Foaming occurred similarly in the presence of an acid.

Example 2: Descaling with a Treatment Fluid Comprising PMIDA.

Aqueous treatment fluids containing various concentrations of dissolved PMIDA were contacted with gypsum at 300° F. in a closed Parr reactor pressurized at 500 psi. The contact time of the treatment fluid with the gypsum was 6 hours in all cases. In this case, this set of experiments, the treatment fluid was not foamed. The testing conditions are summarized in Table 1.

TABLE 1

| Treatment Fluid | PMIDA Concentration (M) | pH | % Gypsum Dissolved |
|---|---|---|---|
| 1 | 0.5 | 7 | 49.99 |
| 2 | 1 | 7 | 52.67 |
| 3 | 0.5 | 8 | 70.81 |

As shown in Table 1, PMIDA was operable to dissolve gypsum scale under reaction conditions in which a stable foam can be formed.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a foamed treatment fluid having a continuous liquid phase and a discontinuous gas phase into a wellbore penetrating a subterranean formation, the foamed treatment fluid being substantially free of hydrofluoric acid or a hydrofluoric acid-generating compound, the foamed treatment fluid comprising:
   a plurality of particulates comprising an N-(phosphonoalkyl)iminodiacetic acid, and
   an acid in which the N-(phosphonoalkyl)iminodiacetic acid is substantially insoluble; and
   depositing at least a portion of the plurality of particulates at one or more locations within the subterranean formation.

2. The method of claim 1, wherein the plurality of particulates is at least partially deposited in a fracture network within the subterranean formation.

3. The method of claim 1, further comprising:
   diverting at least a portion of the foamed treatment fluid or a subsequently introduced treatment fluid with the plurality of particulates following deposition thereof.

4. The method of claim 1, further comprising:
   dissolving at least a portion of an acid-reactive surface in the subterranean formation with the acid in the foamed treatment fluid, a pH of the foamed treatment fluid rising as the acid at least partially spends during dissolution.

5. The method of claim 4, wherein the N-(phosphonoalkyl)iminodiacetic acid at least partially deprotonates as the pH rises, the method further comprising:

dissolving at least a portion of the acid-reactive surface in the subterranean formation with a deprotonated form of the N-(phosphonoalkyl)iminodiacetic acid.

6. The method of claim 4, wherein the acid-reactive surface comprises a matrix of the subterranean formation or a particulate pack within the subterranean formation.

7. The method of claim 6, wherein the subterranean formation comprises a carbonate formation and the matrix comprises a mineral selected from the group consisting of calcite, dolomite, siderite, and any combination thereof.

8. The method of claim 1, wherein the N-(phosphonoalkyl)iminodiacetic acid has a structure of

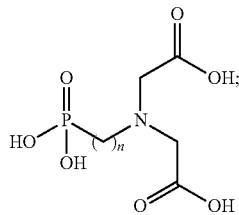

wherein n is an integer ranging between 1 and about 20.

9. The method of claim 8, wherein the N-(phosphonoalkyl)iminodiacetic acid comprises N-(phosphonomethyl)iminodiacetic acid.

10. The method of claim 1, wherein the foamed treatment fluid has a pH of about 3.5 or less.

11. A method comprising:
interacting a foamed treatment fluid having a continuous liquid phase and a discontinuous gas phase with an acid-reactive surface, the foamed treatment fluid being substantially free of hydrofluoric acid or a hydrofluoric acid-generating compound, the foamed treatment fluid comprising:
a plurality of particulates comprising an N-(phosphonoalkyl)iminodiacetic acid, and
an acid in which the N-(phosphonoalkyl)iminodiacetic acid is substantially insoluble;
reacting the acid with at least a portion of the acid-reactive surface, thereby at least partially spending the acid; and
as the acid at least partially spends and a pH of the foamed treatment fluid rises, dissolving the N-(phosphonoalkyl)iminodiacetic acid in the foamed treatment fluid.

12. The method of claim 11, wherein the acid-reactive surface is within a wellbore or a subterranean formation penetrated by the wellbore.

13. The method of claim 12, wherein the plurality of particulates is at least partially deposited in a fracture network within the subterranean formation.

14. The method of claim 12, further comprising:
depositing at least a portion of the plurality of particulates upon the acid-reactive surface; and
diverting at least a portion of the foamed treatment fluid or a subsequently introduced treatment fluid with the plurality of particulates following deposition thereof.

15. The method of claim 12, wherein the acid-reactive surface comprises a matrix of the subterranean formation or a particulate pack within the subterranean formation.

16. The method of claim 15, wherein the subterranean formation comprises a carbonate formation and the matrix comprises a mineral selected from the group consisting of calcite, dolomite, siderite, and any combination thereof.

17. The method of claim 11, further comprising:
dissolving at least a portion of the acid-reactive surface with a deprotonated form of the N-(phosphonoalkyl)iminodiacetic acid.

18. The method of claim 17, wherein dissolving at least a portion of the acid-reactive surface comprises complexing a metal ion with the deprotonated form of the N-(phosphonoalkyl)iminodiacetic acid.

19. The method of claim 11, wherein the N-(phosphonoalkyl)iminodiacetic acid has a structure of

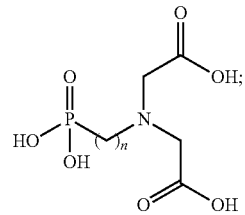

wherein n is an integer ranging between 1 and about 20.

20. The method of claim 19 wherein the N-(phosphonoalkyl)iminodiacetic acid comprises N-(phosphonomethyl)iminodiacetic acid.

21. The method of claim 11, wherein the foamed treatment fluid has a pH of about 3.5 or less.

22. A foamed treatment fluid having a continuous liquid phase and a discontinuous gas phase and comprising:
a plurality of particulates comprising an N-(phosphonoalkyl)iminodiacetic acid; and
an acid in which the N-(phosphonoalkyl)iminodiacetic acid is substantially insoluble, wherein the foamed treatment fluid is substantially free of hydrofluoric acid or a hydrofluoric acid-generating compound.

23. The foamed treatment fluid of claim 22, wherein the N-(phosphonoalkyl)iminodiacetic acid has a structure of

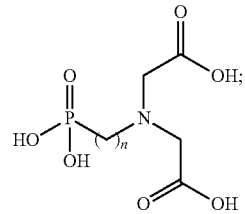

wherein n is an integer ranging between 1 and about 20.

24. The foamed treatment fluid of claim 23, wherein the N-(phosphonoalkyl)iminodiacetic acid comprises N-(phosphonomethyl)iminodiacetic acid.

25. The foamed treatment fluid of claim 22, wherein the foamed treatment fluid has a pH of about 3.5 or less.

26. A system comprising:
a pump fluidly coupled to a tubular, the tubular containing a foamed treatment fluid having a continuous liquid phase and a discontinuous gas phase, the foamed treatment fluid being substantially free of hydrofluoric acid or a hydrofluoric acid-generating compound, the foamed treatment fluid comprising:
a plurality of particulates comprising an N-(phosphonoalkyl)iminodiacetic acid; and
an acid in which the N-(phosphonoalkyl)iminodiacetic acid is substantially insoluble.

* * * * *